US011386400B2

(12) United States Patent
Chinnasamy et al.

(10) Patent No.: US 11,386,400 B2
(45) Date of Patent: Jul. 12, 2022

(54) UNIFIED EVENT/TASK CREATION FROM AUTO GENERATED ENTERPRISE COMMUNICATION CHANNELS AND NOTIFICATIONS

(71) Applicant: Citrix Systems, Inc., Fort Lauderdale, FL (US)

(72) Inventors: Vetrivel Chinnasamy, Bengaluru (IN); Nandikotkur Achyuth, Bengaluru (IN); Arnav Akhoury, Bengaluru (IN)

(73) Assignee: Citrix Systems, Inc., Ft. Lauderdale, FL (US)

( * ) Notice: Subject to any disclaimer, the term of this patent is extended or adjusted under 35 U.S.C. 154(b) by 148 days.

(21) Appl. No.: 16/558,819

(22) Filed: Sep. 3, 2019

(65) Prior Publication Data
US 2021/0065136 A1    Mar. 4, 2021

(51) Int. Cl.
*G06Q 10/00* (2012.01)
*G06Q 10/10* (2012.01)
(Continued)

(52) U.S. Cl.
CPC ......... *G06Q 10/1097* (2013.01); *G06F 16/22* (2019.01); *G06F 16/953* (2019.01); *G06Q 10/107* (2013.01); *H04L 67/10* (2013.01)

(58) Field of Classification Search
None
See application file for complete search history.

(56) References Cited

U.S. PATENT DOCUMENTS

2002/0147726 A1* 10/2002 Yehia ............... G06Q 10/10
2002/0194379 A1* 12/2002 Bennett ............ H04L 29/06
                                                    709/219
(Continued)

OTHER PUBLICATIONS

Greene, Jessica, Automate Your Inbox with these Tips, Tools, and Templates, May 7, 2018, Zapier, https://zapier.com/blog/automate-email-inbox/, p. 11 (Year: 2018).*

*Primary Examiner* — Joseph M Waesco
(74) *Attorney, Agent, or Firm* — Daly, Crowley, Mofford & Durkee, LLP

(57) ABSTRACT

Described herein are systems and techniques for segregating different types of auto-generated enterprise communications, identifying actionable items found within the enterprise communications and automatically generating a list of unified events/tasks for presentation to a user. The systems and techniques utilize templates to identify a communication. Once a communication is identified, rule sets are applied to parse the communication and generate an event which can be presented to a user as part of an event/task list. Described systems and techniques may process different type of communications such as email and real-time communications, parses each type of communication and generate a unified event/task list (i.e. a single task list which includes events from emails, real time messages and other communication channels) which can be presented to a user. By generating a unified event/task list, the system and techniques remove the need for users to manually scour their communications for actionable items and also removes the need for users to manually scour individual communications (e.g. individual emails and real time messages) for information, events or tasks which may require action.

18 Claims, 9 Drawing Sheets

(51) Int. Cl.
  *H04L 67/10* (2022.01)
  *G06F 16/22* (2019.01)
  *G06F 16/953* (2019.01)

(56) References Cited

U.S. PATENT DOCUMENTS

| | | | | |
|---|---|---|---|---|
| 2010/0030734 | A1* | 2/2010 | Chunilal | G06Q 20/322 709/205 |
| 2012/0266210 | A1* | 10/2012 | Jones | G06F 16/334 726/1 |
| 2013/0246377 | A1* | 9/2013 | Gaitonde | H04L 41/0813 707/697 |
| 2013/0318172 | A1* | 11/2013 | Liberty | H04L 51/00 709/206 |
| 2015/0012399 | A1* | 1/2015 | Ceribelli | G06Q 50/01 705/34 |
| 2015/0324757 | A1* | 11/2015 | Carroll | G06Q 10/1095 705/7.19 |
| 2016/0210602 | A1* | 7/2016 | Siddique | G06Q 20/384 |
| 2018/0081496 | A1* | 3/2018 | Bhardwaj | G06F 3/0488 |
| 2018/0129995 | A1* | 5/2018 | Fowler | G06Q 10/06314 |
| 2018/0329744 | A1* | 11/2018 | Shear | G06F 16/245 |
| 2019/0042867 | A1* | 2/2019 | Chen | G06V 10/20 |
| 2019/0042870 | A1* | 2/2019 | Chen | G06V 10/75 |
| 2019/0098139 | A1* | 3/2019 | Crown | H04L 12/1822 |
| 2019/0317643 | A1* | 10/2019 | Bhardwaj | G06F 3/011 |
| 2019/0361871 | A1* | 11/2019 | Brunets | H04L 43/0876 |
| 2019/0361905 | A1* | 11/2019 | Rogynskyy | G06F 16/23 |
| 2019/0361910 | A1* | 11/2019 | Rogynskyy | G06F 16/221 |
| 2019/0361923 | A1* | 11/2019 | Joseph | G06F 16/2272 |
| 2019/0364130 | A1* | 11/2019 | Rogynskyy | G06F 16/288 |
| 2019/0384794 | A1* | 12/2019 | Holly, Jr. | G06F 21/41 |
| 2020/0159579 | A1* | 5/2020 | Shear | G06Q 10/0631 |
| 2020/0322484 | A1* | 10/2020 | Crown | H04L 12/1818 |

* cited by examiner

UNIFIED EVENT/TASK CREATION FROM AUTO GENERATED ENTERPRISE COMMUNICATION CHANNELS AND NOTIFICATIONS

BACKGROUND

As is known in the art, auto-generated enterprise communications can be a significant source of email traffic for a user. As is also known, auto generated enterprise communications may contain information of significance or which requires action.

SUMMARY

Described herein are concepts, systems and techniques which segregates different types of auto-generated enterprise communications, identifies actionable items found within the enterprise communications and automatically generates a list of unified events/tasks for presentation to a user. The concepts, systems and techniques described utilize templates to identify a communication. Once a communication is identified, rule sets are applied to parse the communication and generate an event which can be presented to a user. The event may be something which requires action. The event may be provided to a user as part of an event/task list. In embodiments, the concepts, systems and techniques process different type of communications such as email and real-time communications, parses each type of communication and generates events for the disparate types of communications. The system may them generate a unified event/task list (i.e. a single task list which includes events from emails, real time messages and other communication channels) which can be presented to a user. By generating a unified event/task list, the system removes the need for users to manually scour their communications for actionable items and also removes the need for users to manually scour individual communications (e.g. individual emails and real time messages) for information, events or tasks which may require action.

In embodiments the concepts, systems and techniques described herein generate a list of actionable tasks/events for users from enterprise communications including fixed and variable length communications such as emails and real time messages. The enterprise communications may originate from any of be a wide variety of different resources including, but not limited to email, and real-time messages, including but not limited to, text messages and instant messages.

BRIEF DESCRIPTION OF THE DRAWINGS

The foregoing features may be more fully understood from the following description of the drawings in which:

FIG. 8 is a screen shot of an illustrative auto generated email; and

DETAILED DESCRIPTION

Figure 1:
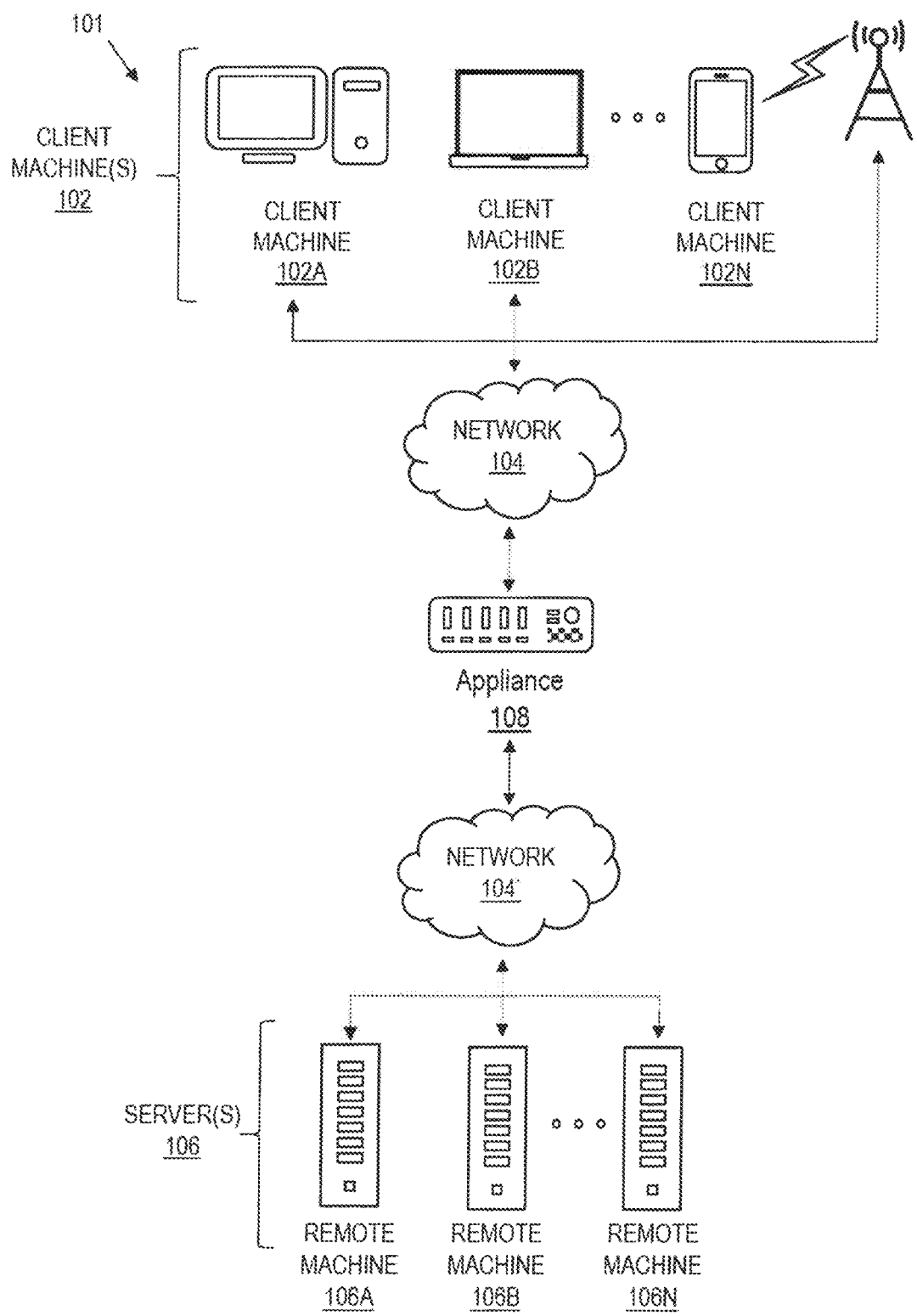
FIG. 1 is a block diagram illustrating an example network environment of computing devices in which various aspects of the disclosure may be implemented, in accordance with an embodiment of the present disclosure.

Referring now to FIG. 1, shown is an example network environment 101 of computing devices in which various aspects of the disclosure may be implemented, in accordance with an embodiment of the present disclosure. As shown, environment 101 includes one or more client machines 102A-102N, one or more remote machines 106A-106N, one or more networks 104, 104', and one or more appliances 108 installed within environment 101. Client machines 102A-102N communicate with remote machines 106A-106N via networks 104, 104'.

In some embodiments, client machines 102A-102N communicate with remote machines 106A-106N via an intermediary appliance 108. The illustrated appliance 108 is positioned between networks 104, 104' and may also be referred to as a network interface or gateway. In some embodiments, appliance 108 may operate as an application delivery controller (ADC) to provide clients with access to business applications and other data deployed in a datacenter, a cloud computing environment, or delivered as Software as a Service (SaaS) across a range of client devices, and/or provide other functionality such as load balancing, etc. In some embodiments, multiple appliances 108 may be used, and appliance(s) 108 may be deployed as part of network 104 and/or 104'.

Client machines 102A-102N may be generally referred to as client machines 102, local machines 102, clients 102, client nodes 102, client computers 102, client devices 102, computing devices 102, endpoints 102, or endpoint nodes 102. Remote machines 106A-106N may be generally referred to as servers 106 or a server farm 106. In some embodiments, a client device 102 may have the capacity to function as both a client node seeking access to resources provided by server 106 and as a server 106 providing access to hosted resources for other client devices 102A-102N. Networks 104, 104' may be generally referred to as a network 104. Networks 104 may be configured in any combination of wired and wireless networks.

Server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

Server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, server 106 may execute a remote presentation services program or other program that uses a thin-client or a remote-display protocol to capture display output generated by an application executing on server 106 and transmit the application display output to client device 102.

In yet other embodiments, server 106 may execute a virtual machine providing, to a user of client device 102, access to a computing environment. Client device 102 may be a virtual machine. The virtual machine may be managed by, for example, a hypervisor, a virtual machine manager (VMM), or any other hardware virtualization technique within server 106.

In some embodiments, network 104 may be: a local-area network (LAN); a metropolitan area network (MAN); a wide area network (WAN); a primary public network; and a primary private network. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
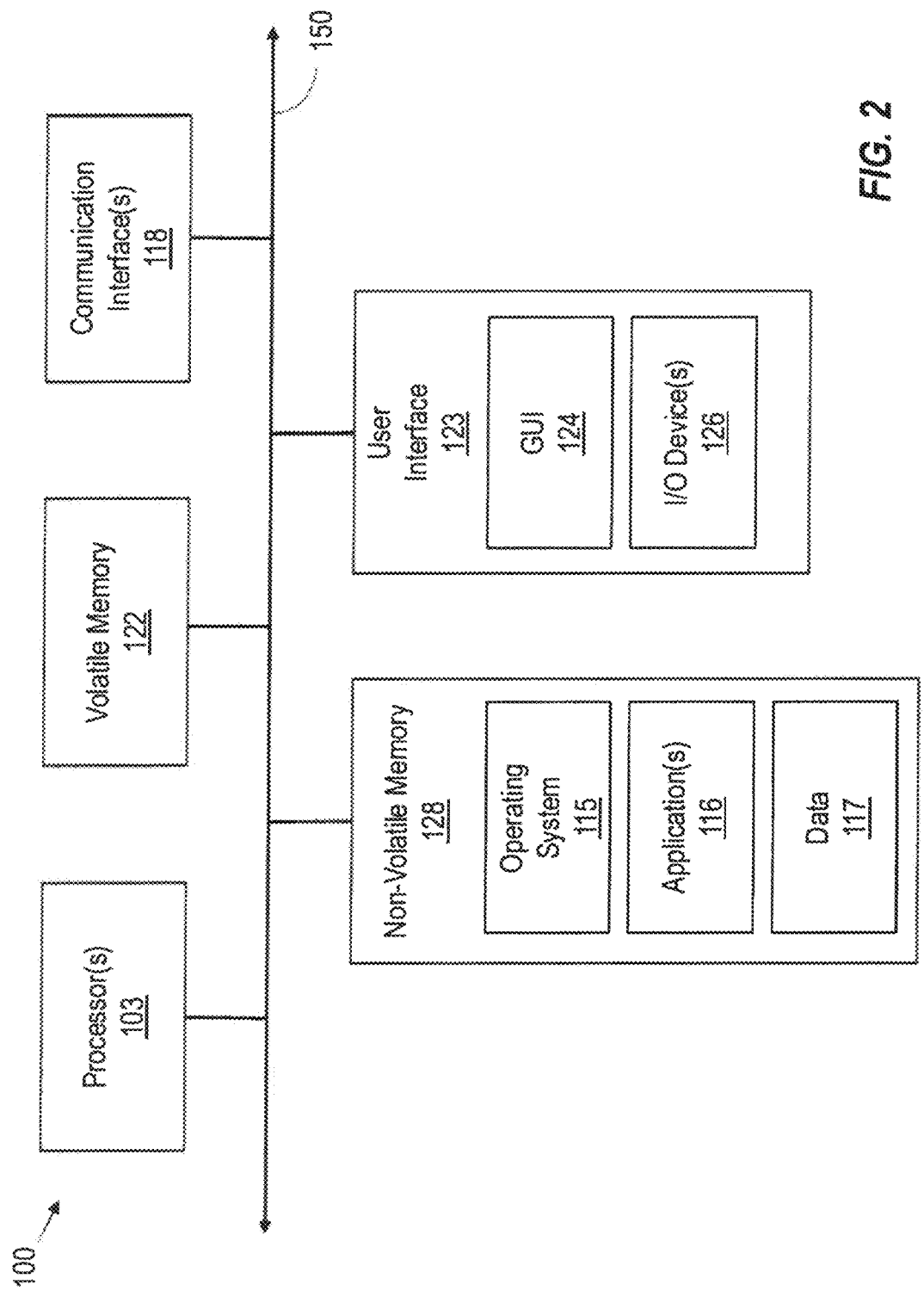
FIG. 2 is a block diagram illustrating selective components of an example computing device in which various aspects of the disclosure may be implemented, in accordance with an embodiment of the present disclosure.

FIG. 2 is a block diagram illustrating selective components of an example computing device 100 in which various aspects of the disclosure may be implemented, in accordance with an embodiment of the present disclosure. For instance, client devices 102, appliances 108, and/or servers 106 of FIG. 1 can be substantially similar to computing device 100. As shown, computing device 100 includes one or more processors 103, a volatile memory 122 (e.g., random access memory (RAM)), a non-volatile memory 128, a user interface (UI) 123, one or more communications interfaces 118, and a communications bus 150.

Non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

Non-volatile memory 128 stores an operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computing device 100 may communicate via communications bus 150.

The illustrated computing device 100 is shown merely as an example client device or server and may be implemented by any computing or processing environment with any type of machine or set of machines that may have suitable hardware and/or software capable of operating as described herein.

Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 103 may be analog, digital or mixed-signal. In some embodiments, processor 103 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computing device 100 to access a computer network such as a Local Area Network (LAN), a Wide Area Network (WAN), a Personal Area Network (PAN), or the Internet through a variety of wired and/or wireless connections, including cellular connections.

In described embodiments, computing device 100 may execute an application on behalf of a user of a client device. For example, computing device 100 may execute one or more virtual machines managed by a hypervisor. Each virtual machine may provide an execution session within which applications execute on behalf of a user or a client device, such as a hosted desktop session. Computing device 100 may also execute a terminal services session to provide a hosted desktop environment. Computing device 100 may provide access to a remote computing environment including one or more applications, one or more desktop applications, and one or more desktop sessions in which one or more applications may execute.

Figure 3:
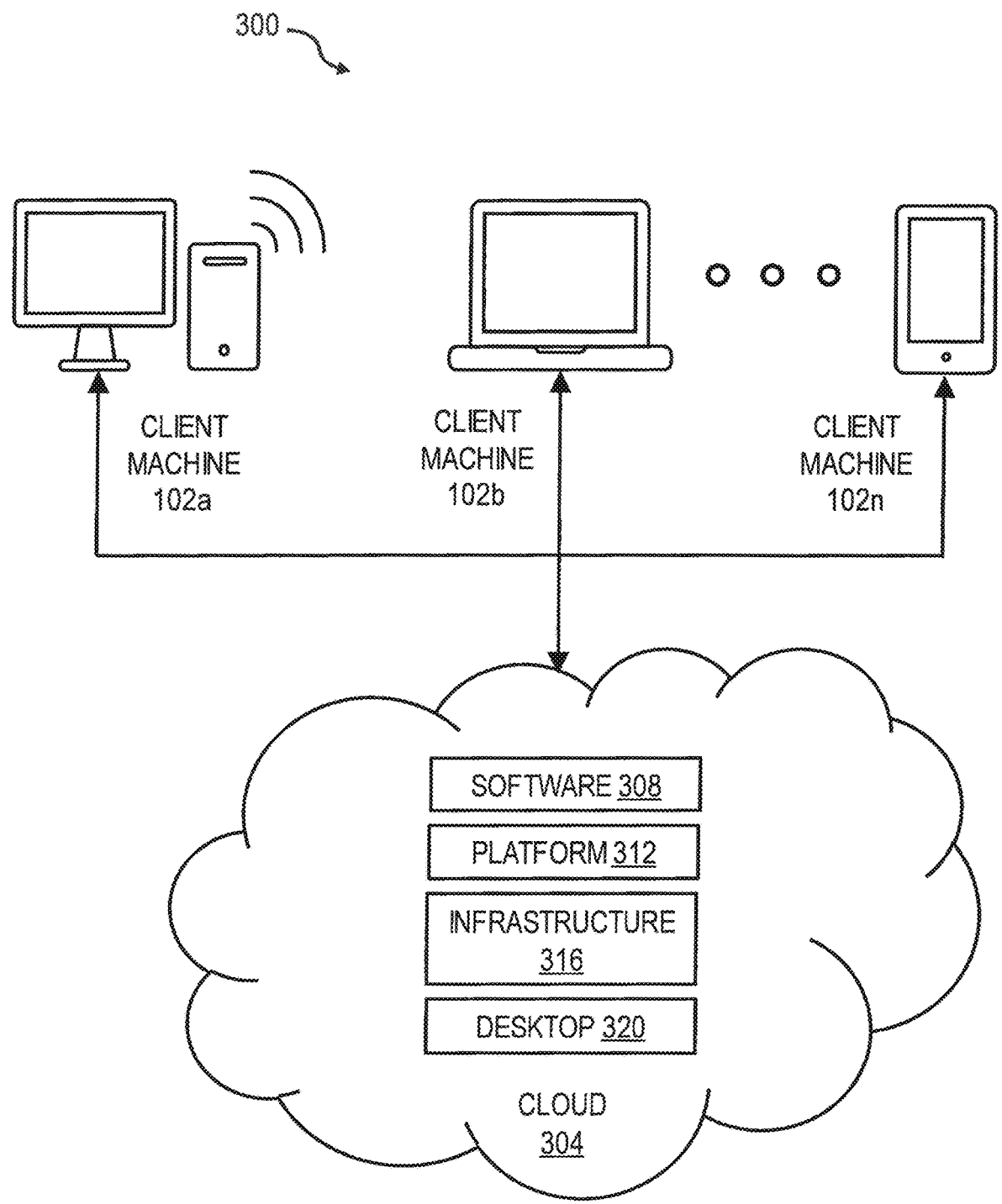
FIG. 3 is a block diagram of a cloud computing environment in which various aspects of the concepts described herein may be implemented.

Referring to FIG. 3, a cloud computing environment 300 is depicted, which may also be referred to as a cloud environment, cloud computing or cloud network. The cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 300, one or more clients 102a-102n (such as those described above) are in communication with a cloud network 304. The cloud network 304 may include back-end platforms, e.g., servers, storage, server farms or data centers. The users or clients 102a-102n can correspond to a single organization/tenant or multiple organizations/tenants. More particularly, in one example implementation the cloud computing environment 300 may provide a private cloud serving a single organization (e.g., enterprise cloud). In another example, the cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 300 may provide a hybrid cloud that is a combination of a public cloud and a private cloud. Public clouds may include public servers that are maintained by third parties to the clients 102a-102n or the enterprise/tenant. The servers may be located off-site in remote geographical locations or otherwise.

The cloud computing environment 300 can provide resource pooling to serve multiple users via clients 102a-102n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 300 can provide on-demand self-service to unilaterally provision computing capabilities (e.g., server time, network storage) across a network for multiple clients 102a-102n. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 300 can provide an elasticity to dynamically scale out or scale in response to different demands from one or more clients 102. In some embodiments, the cloud computing environment 300 can include or provide monitoring services to monitor, control and/or generate reports corresponding to the provided shared services and resources.

In some embodiments, the cloud computing environment 300 may provide cloud-based delivery of different types of cloud computing services, such as Software as a service (SaaS) 308, Platform as a Service (PaaS) 312, Infrastructure as a Service (IaaS) 316, and Desktop as a Service (DaaS) 320, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4:
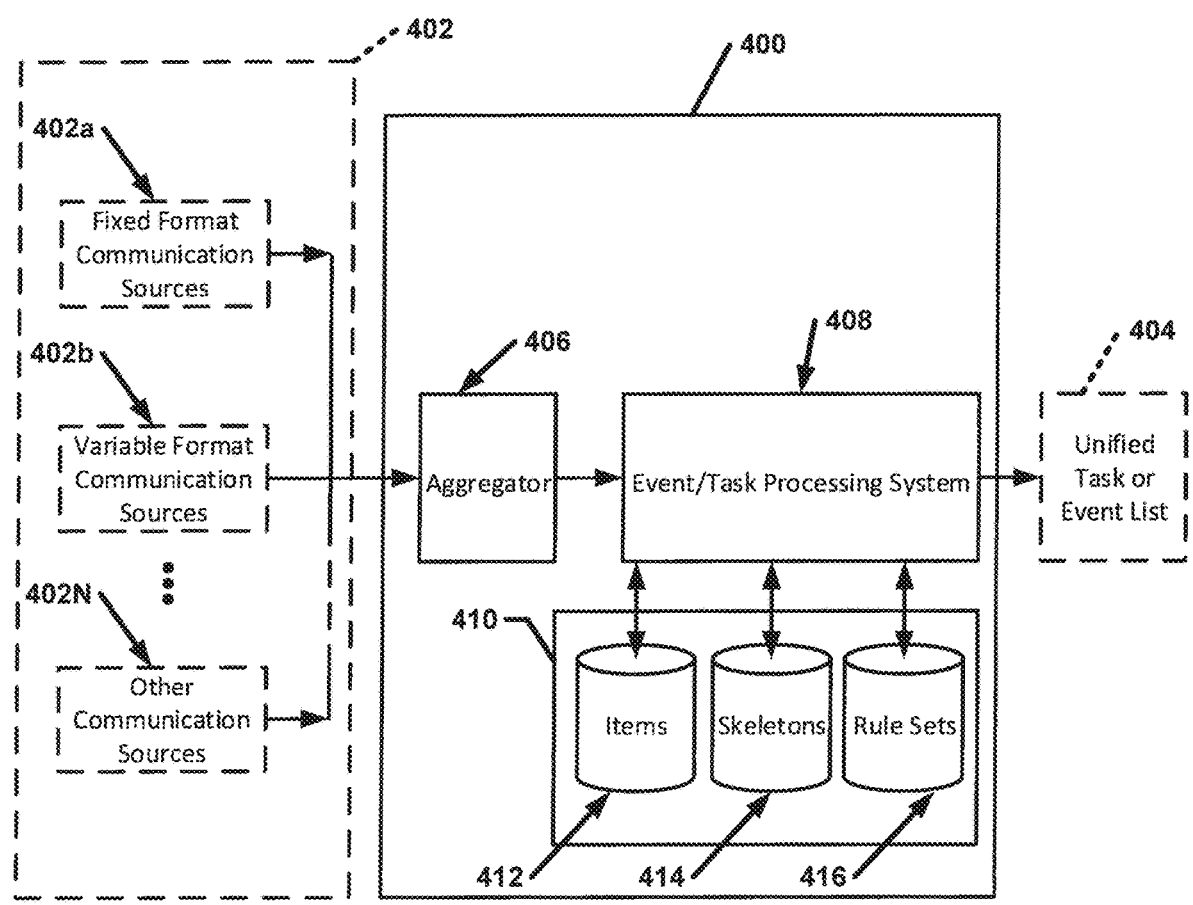
FIG. 4 is a block diagram of a unified event/task list generator.

Referring now to FIG. 4, a system 400 configured to receive communications provided thereto from a variety of different sources generally denoted 402 and in response thereto generate a unified event/task list 404 includes an aggregator 406, an event/task processing system 408 (or more simply an event processor 408) and a database 410. It should be appreciated that in embodiments, one or both of aggregator 406 and database 410 may be part of event/task processing system 408. It should also be appreciated that sources 404 and unified event/task list 402 are shown in phantom since they are not properly a part of system 400.

Communication sources 402 may, for example, correspond to any auto-generated enterprise communication sources including fixed format communication sources 402a, and variable format communication sources 402b. Such resources may, for example, correspond to emails and real-time messages, including but not limited to, text messages and instant messages. Examples of fixed and variable format communication sources include, but are not limited to email (fixed format communication) and Slack messages (variable format communication), system notifications sent via different enterprise applications, including SaaS applications, other enterprise communication solutions which can be used to process the information such as Trello® (which has a notification system), Skype® for Business, JIRA® notifications, Google Hangout® (business version), Cisco Jabber®, other email clients, etc.

Communication sources 400 may also include any other type of communication source 400N. It should be appreciated that for all such sources that the format is not fixed, the system may rely, for example, upon a natural language processing module to obtain the information and that will fall under the variable format category.*****

Aggregator 406 is capable of receiving communications on multiple different types of communication channels and thus is capable of receiving communications (e.g. auto-generated enterprise communications) from any of the sources 402. As used herein, a "communication channel" (or more simply a "channel") refers to some form of pathway or medium over which data (or more broadly, information) may be passed from one location to another. A channel is typically characterized by its capacity for transmitting information (e.g. as measured by its bandwidth typically expressed in units of Hertz (Hz) or by a data rate typically expressed in units of bits per second. A channel is used to convey an information signal, for example a digital bit stream, from one or several senders (or transmitters) to one or several receivers. In embodiments, communication channels may comprise one or a combination of transmission media including but not limited to cable (e.g. wire line media comprising physical wires or cables such as twisted-pair wire, cable, and fiber-optic cable) and broadcast media (e.g. microwave, satellite, radio, and infrared).

In response to the communications provided thereto on one or more different channels, aggregator 406 provides the communications to event/task processing system 408. In embodiments, the aggregator provides the communications in the order in which it was received. In embodiments, the aggregator fetches information from one or more of the different sources and provides the information to event/task processing system 408 for further processing. In embodiments, event/task processing system is responsible for determining the priority and the order of the notifications/tasks. In some embodiments, it may be possible for the aggregator to perform such processing. In embodiments, the aggregator may be considered as an input module which reads the messages and checks if it can be processed by the event/task processing system. For example, the aggregator may check to see if a skeleton is present. If a skeleton is already present (i.e. if a match is found), then the payload may be sent to the event/task processor for event generation. On the other hand, if a skeleton is not present (i.e. a match is not found), the aggregator may process the input (using natural language processing, for example) and create a new skeleton which has to be reviewed. If the skeleton is reviewed and accepted, any subsequent input that matches the model will go through the newly created skeleton. If the model is rejected, then it may not be possible to process similar requests.

The event/task processing system 408 receives the communications provided thereto and processes the communications by first validating each communication against one or skeleton templates. The one or more skeleton templates may be stored in database 410. It should be appreciated that database 410 may be provided as a single database or may comprise multiple databases. In the illustrative embodiment of FIG. 4, database 410 is comprised of an items database 412, a skeletons database 414 and a rules sets database 416. Communications received by system 400 may be stored in items database 412, skeleton templates 414 may be stored in skeletons database 412 and rule sets corresponding to the difference skeleton templates may be stored in rule sets database 416.

In response to event/task processing system 408 receiving a communication item (e.g. from aggregator 406), event/task processing system 408 attempts to match the item with a template stored in the templates database 414 and optionally may store the item in items database 412. If In response to a communication matching a skeleton template, a rule set for that template is applied to the communication. As illustrated in FIG. 4, database 410 may comprise a rule set database having stored therein at least one rule set for each template stored in skeleton database 414. Thus, in embodiments, there is at least one corresponding rule set for each skeleton template stored in the skeleton database 414.

The skeleton structure defines the location of different parameters in the communication. It should be appreciated that the particular location of different parameters in the communication item depends upon the particular type of communication being processed. For example, the location of different parameters in an email, (for example, username, new assignee name, status, etc.) may differ from the location of similar parameters in a real-time message (e.g. a Slack message). Furthermore, the location of different parameters in one type of email (or a real time message such as a text message) may differ from the location of the same parameters in a different type of email (or real time message such as an instant message). Using this information (i.e. the location of different parameters in a communication), the event/task processing system 408 will generate actionable tasks.

The skeleton templates are represented in form of mapping between keywords and where the relevant information can be fetched from in the input.

For example, in the below communication:
Issue Type: Story
Assignee: Nandikotkur Achyuth
Components: Worxmail for Android
Created: 2019-07-16 02:20
Labels: g11n
Priority: ? Unset
Reporter: Sujie Li
Add Comment If one wanted to define a skeleton, one may consider the various parameters that have to be fetched from the input communication message, and the skeleton may, for example, look something like this:

```
{
    "Keyword" = "Assignee",
    "Value" = %AssigneeName%
}
{
    "Keyword" = "Labels",
    "Value" = %LabelText%
}
```

The above skeleton deals with just two parameters (namely, Assignee and Labels). The value (in this case % AssigneeName % and % LabelText %) will be replaced during parsing by string matching. i.e., the string which follows the keyword will be the value of it.

So, in this example Keyword "Assignee" is followed by "Nandikotkur Achyuth" which become the value for the keyword. Similarly, we will get the Labels as well. A more detailed skeleton will also define other keywords, such as "Issue Type", "Components", "Reporter", "Created", etc. Ideally, a well-defined skeleton will have a definition to fetch all the keywords on the communication input. Please note that a more detailed example of skeleton rule application is discussed below. Now, that we know (using the skeleton) what all keywords have to be used/processed, the rule set will be used to determine how to fetch the value. So, in the above example the rule set will have a rule stating the delimiter between the Keyword and the value.
% Keyword %: <space> % value %

The above rule states that, using the skeleton, when a mapping for the keyword is received, the system will have to look for a ':' (colon) and a whitespace before the value can be encountered. Similarly, depending upon the situation or the expected input, the delimiter value will change. Some of the common delimiter value include: " ", ";", ":", ",", "|", to illustrate but a few examples.

If a communication item is matched to a skeleton template, event processor 400 parses the content of the communication using the appropriate skeleton template (i.e. the template matched to the communication) and the corresponding rule set and generates an event in an event list as per the given structure of the template. The template may, for example, include fields for various pieces of information including, but not limited to at least some of the following information: the task/event description, due date, source of origin of the tasks/events, and any other available information. Event processor 400 may also classify the list. The list may, for example, be classified as belonging to one of an "Actionable" group and/or one of an "Information" group. In embodiments, this may be accomplished by obtaining a field (or keyword) and then using the set of rules applied to the appropriate skeleton to determine the appropriate classification parameter.

The so-created event/task list 404 can be highlighted/grouped/categorized based upon a variety of different pieces of information including but not limited to a date (e.g. a due date, priority and other classifications of the communications being processed so as to make the event/task list more user friendly.

Thus, in an embodiment, when processing a communication, the event/task processor 400 may first check to see if database 410 has stored therein a relevant skeleton structure for the communication being process (e.g. for a specific type of an email or real time message such as a Slack message or other type of communication). The skeleton structure defines the location of different parameters in the communication. Using this information, the event/task processing system 408 applies a rule set and generates actionable tasks which are added to an actionable task list which in turn is provided (e.g. displayed or otherwise communicated) to a user.

Figure 5:
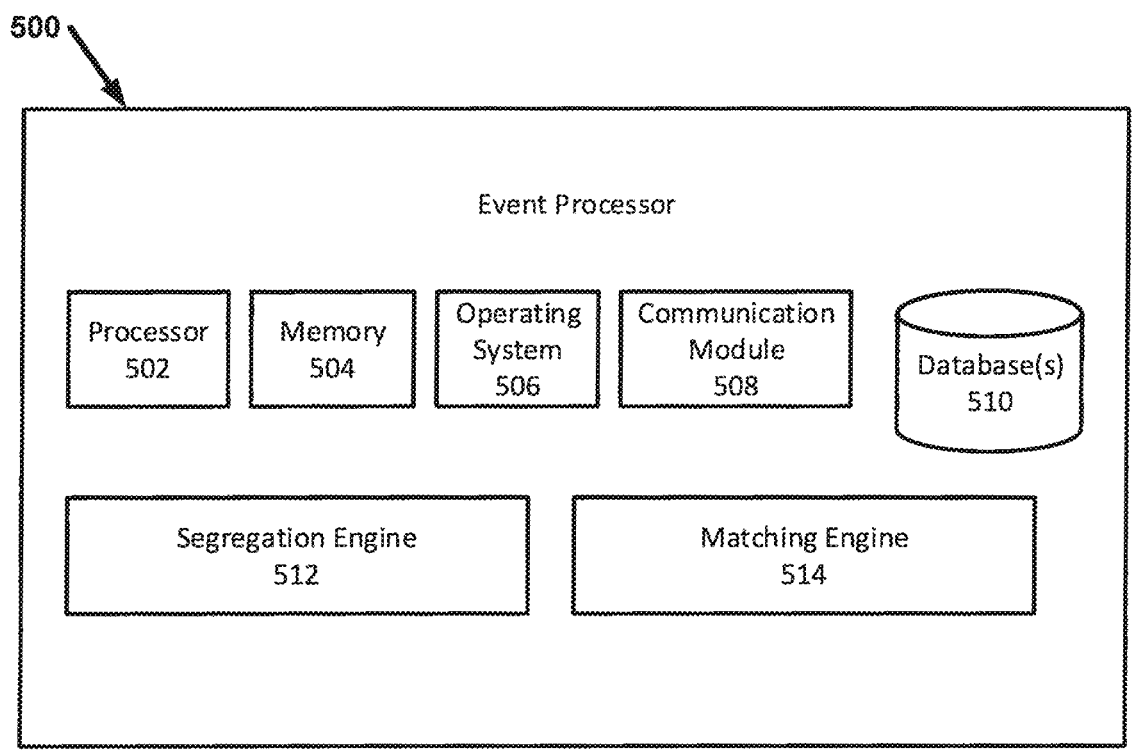
FIG. 5 is a block diagram of an event processor.

Referring now to FIG. 5, an event/task processing system 500 (or more simply event processor 500) which may be the same as or similar to event/task processing system 400 described above in conjunction with FIG. 4, includes one or more software modules configured to implement certain of the functionalities disclosed herein, and optionally further includes hardware configured to enable such implementation. This hardware and/or software may include, but is not limited to, a processor 502, a memory 504, an operating system 506, a communication module 508, and optionally one or more databases or data stores 510. In this illustrative embodiment, event processor 500 also includes a parser 512 and a matching engine 514.

Event/task processing system 500 can be configured to facilitate the generation of an event/task list which may be the same as or similar to event/task list 404 described above in conjunction with FIG. 1.

Processor 502 may be designed to control the operations of the various other components of event/task processing system 500. Processor 502 may include any processing unit(s) suitable for use in system 500, such as a single core or multi-core processor. In general, processor 502 may include any suitable special-purpose or general-purpose computer, computing entity, or computing or processing device including various computer hardware, or firmware, and may be configured to execute instructions, such as program instructions, stored on any applicable computer-readable storage media. For example, processor 502 may include one or more of a microprocessor, a central processing unit (CPU), a microcontroller, a digital signal processor (DSP), an application-specific integrated circuit (ASIC), a Field-Programmable Gate Array (FPGA), Complex Instruction Set Computer (CISC), Reduced Instruction Set Computer (RISC), multi core, or any other digital or analog circuitry configured to interpret and/or to execute program instructions and/or to process data, whether loaded from memory or implemented directly in hardware. It should thus be appreciated that, although illustrated as a single processor in FIG. 5, processor 502 may include any number of processors and/or processor cores configured to, individually or collectively, perform or direct performance of any number of operations described in the present disclosure. In this regard, processor 502 may be the same as or similar to processor 103 described previously with respect to computing device 100 of FIG. 2.

Memory 504 may include computer-readable storage media configured for carrying or having computer-executable instructions or data structures stored thereon. Such computer-readable storage media may include any available media that may be accessed by a general-purpose or special-purpose computer, such as processor 502. By way of example, and not limitation, such computer-readable storage media may include non-transitory computer-readable storage media including Random Access Memory (RAM), Dynamic Random Access Memory (DRAM), Synchronized Dynamic Random Access Memory (SDRAM), Static Random Access Memory (SRAM), non-volatile memory (NVM), or any other suitable storage medium which may be used to carry or store particular program code in the form of computer-executable instructions or data structures and which may be accessed by a general-purpose or special-purpose computer. Combinations of the above may also be included within the scope of computer-readable storage media. In this regard, memory 504 may be the same as or similar to volatile memory 222 described previously with respect to computing device 200 of FIG. 2.

Operating system 506 may comprise any suitable operating system, such as UNIX®, LINUX®, MICROSOFT® WINDOWS® (Microsoft Crop., Redmond, Wash.), GOOGLE® ANDROID™ (Google Inc., Mountain View, Calif.), APPLE® iOS (Apple Inc., Cupertino, Calif.), or APPLE® OS X° (Apple Inc., Cupertino, Calif.). As will be appreciated in light of this disclosure, the techniques provided herein can be implemented without regard to the particular operating system provided in conjunction with event/task processing system 500, and therefore may also be implemented using any suitable existing or subsequently developed platform. In this regard, operating system 506 may be the same as or similar to operating system 215 described previously with respect to computing device 200 of FIG. 2.

Communication module 508 can be any appropriate network chip or chipset which allows for wired or wireless communication via a network or networks to one or more of the other components described herein. Communication module 508 can also be configured to provide intra-device communications via a bus or an interconnect. In this regard, communication module 508 may be the same as or similar to communication interface 218 described previously with respect to computing device 200 of FIG. 2. In embodiments, communication module 508 may be configured to function as an aggregator as described above in conjunction with FIG. 4.

Database 510 is configured to store skeleton definition templates and a corresponding list of skeleton rule sets for use with communication messages received via one or more resources (e.g. email, real time message or any other communication channel) as described herein. Database 510 may be provided from any type of computer-readable storage media configured for short-term or long-term storage of data. By way of example, and not limitation, such computer-readable storage media may include a hard drive, solid-state drive, Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), non-volatile memory (NVM), or any other storage medium, including those provided above in conjunction with memory 504, which may be used to carry or store particular program code in the form of computer-readable and computer-executable instructions, software or data structures for implementing the various embodiments as disclosed herein and which may be accessed by a general-purpose or special-purpose computer. Combinations of the above may also be included within the scope of computer-readable storage media.

It should be appreciated that database 510 may be provided as part of system 500 or may be provided separately or remotely from system 500. In this regard, database 510 may be the same as or similar to non-volatile memory 228 described previously with respect to computing device 200 of FIG. 2. In embodiments, the database is populated with rules having the structure of the message templates which can be used as a standard set for segregating the communications.

Referring again to the example embodiment of FIG. 5, system 500 further includes a parser 512 and a matching engine 516. Parser 512 is generally configured to parse information from communications provided thereto. In embodiments, parser 512 may be implemented as a software component which receives input data (e.g. a communication from one or more of the communication resources) and builds a data structure.

An example mail, from which the data structure is built is as shown below.
Issue Type: Story
Assignee: Nandikotkur Achyuth
Components: Worxmail for Android
Created: 2019-07-16 02:20
Labels: g11n
Priority: ? Unset
Reporter: Sujie Li
Add Comment From the above message, a skeleton may be formed based upon the keywords:

```
{
    "Keyword" = "Assignee",
    "Value" = %AssigneeName%
}
{
    "Keyword" = "Labels",
    "Value" = %LabelText%
}
```

Matching engine 514 is configured to validate a communication against the skeleton templates stored in the database 510. In this context, validation means that matching engine 514 determines that a communication matches at least one template in the database).

Example 1 below illustrates an email message received from JIRA® upon a new ticket creation as week as the skeleton definition used in an aggregator to look for matching in the message. The keywords are: "Assignee", "Created", "Priority". The aggregator will parse the mail content and look for the above keywords and their delimiters. Once matching is done, the event processor may extract this information from the message and form a unified format which will be used to create an entry in a task list, for example.

Example 1

Issue Type: Story
Assignee: Nandikotkur Achyuth
Components: Worxmail for Android
Created: 2019-07-16 02:20
Labels: g11n
Priority: ? Unset
Reporter: Sujie Li
Add Comment Example 2 below illustrates a notification in Slack from JIRA BOT and the skeleton definition in the aggregator system to look for the matching in the message. The keywords are: "Assignee", "Created", "Priority". The aggregator system will parse the slack message and look for the above keywords and their delimiters. Once matching is done, the event processor will extract this information from the message and form a unified format which will be used to create an entry in the task list.

Example 2

Jira APP 8:49 PM
Kevin Rowell created Access Request UCOACCESS—2631
CWC Dashboard—Athena Principal Access—Cary Barron

| Assignee | Priority |
|---|---|
| William Aycock | Blocker |

In response to validating a communication, matching engine 514 provides the validated communications to parser 512. In response to receiving a validated communication, parser 512 parses content from the communications using an appropriate one of the skeleton templates and rule sets (i.e. the parsing is based upon corresponding skeleton templates).

Matching engine 514 then applies the rule set corresponding to the skeleton template and generates an event in accordance with the given structure of the appropriate skeleton template to which the communication is matched. In embodiments the event generated by matching engine 514 includes, but is not limited to: a task/event description; a source of the tasks/events based on the available information; and due dates. Also matching engine 514 may utilize the rules sets to classify the event. In embodiments, an event may be classified as an "actionable" event (i.e. an event that requires some action from a user such as a reply to an email or a Slack message) or an "informational" event. Thus, an actionable event is an event that requires some action from a user.

For example, if a communication message for User-B says something like: "User-A has requested a code review," Then reviewing the code becomes an actionable event for User-B (that is to say, User-B should take some action (e.g. code review) upon receiving the communication).

Another example is as follows: in SAP Concur® (a popular expense reporting tool) an employee can request their manager to approve a certain business expense. The auto generated email for the same, from Concur to the manager will look something like:
Expense submitter: Sam
Total Amount: 25 $
Applied On: 22$^{nd}$ of July, 2019

The above message calls for an action from the manager. Thus, the manager will log in to Concur and either accept or reject the expense. And this action can be captured by the solution described herein when creating events.

Other examples of actionable events may include "add", "reply", "comment", etc. It should also be noted that the same communication may include more than one actionable event.

In this way, system 500 operates to segregate communications and automatically (i.e. without human intervention) generate a list of one or more unified events/tasks. For example, system 500 may segregate auto-generated enterprise communications from other types of communications and generate a unified task or event list which may be the same as or similar to unified task or event list 404 (FIG. 4). Thus, the unified events/tasks to be placed on a unified task or event list are generated from the actionable items using the list of skeleton rule sets in the database.

The communication messages which pass through the validation against the skeleton set will thus be parsed (i.e. the content of the communication messages will be parsed) by applying skeleton templates and corresponding rule sets to generate an event in the list as per the given template structure. The template structure may include, but is not limited to, a task/event description, a due date (if any), and/or a source of origin of the tasks/events. The template structure may also include or be based upon any other information which may be derived from or is otherwise available from information in a communication.

Such an event/task list can be highlighted/grouped/categorized based upon a variety of characteristics including, but not limited to due date, priority, a source of origin of the tasks/events, classification and any other available information. The process of highlighting/grouping/categorizing, may make the event/task list more user friendly in the sense that such highlighting/grouping/categorizing may make a particular task/event of interest to a user may allow a user to more quickly and/or easily locate the item (or items) of interest. Classification here refers to the how various events are grouped and shown in the event list. Classification can, for example, be in the following form:

Events that start tomorrow: (classified based on due date)
1. Meet Tom and discuss about the project. (11:30-12:30)
2. Travel to Bangalore. (19:30)
High Priority:
1. Prepare presentation for the project. [Blocker]
2. Fix issues in the script. [Major]
Low Priority:
1. Request for subscription of SAAS app.
Pending Tasks [To Take action on]
1. Approve Leave Request F12112344
2. Approve expense 33123312FG In various embodiments, additional components or a subset of the illustrated components can be employed without deviating from the scope of the present disclosure. For instance, other embodiments may integrate the various functionalities of the event/task processing system 500, including the parser 512 and matching engine 514 into fewer modules (e.g., one or two) or more modules than shown in FIG. 5. In addition, further note that the various components of the event/task processing system 500 may be distributed across additional machines. In some cases, the event/task processing system 500 may be provided as a software application and may be downloaded from a server computing system onto a user device for local execution. In some cases, the functionality provided by the event/task processing system 500 may be provided on a server computing system communicatively coupled to the user device. In a more general sense, the degree of integration and distribution of the functional component(s) provided herein can vary greatly from one embodiment to the next, as will be appreciated in light of this disclosure.

A user may thus have access to a device that facilitates interaction with a unified event/task list system such as the system illustrated in FIG. 4. For example, in certain embodiments, a user may have access to one or more of a variety of suitable computing devices, including devices such as desktop computers, laptop computers, workstations, enterprise class server computers, handheld computers, tablet computers, cellular telephones, smartphones, and set-top boxes. Other devices may be used in other embodiments. The device or devices used by the user may optionally include a wired and/or wireless communication adapter that enables communication via a network. The device or devices may also optionally include input/output components such as one or more of a tactile keyboard, a display, a touch sensitive display, a microphone, a camera, and location services. Such input/output components may allow a user to not only control operation of its own device, but also to control certain operational aspects of event/task processor 500.

Thus, system 500 creates actionable tasks/event list for one or more users from communications (e.g. enterprise messages) from a wide variety of resources (such as resources 402 in FIG. 4) including, but not limited to email, real time messages (e.g. Slack) and notifications thus removing the need to manually review the communications.

Figure 6:
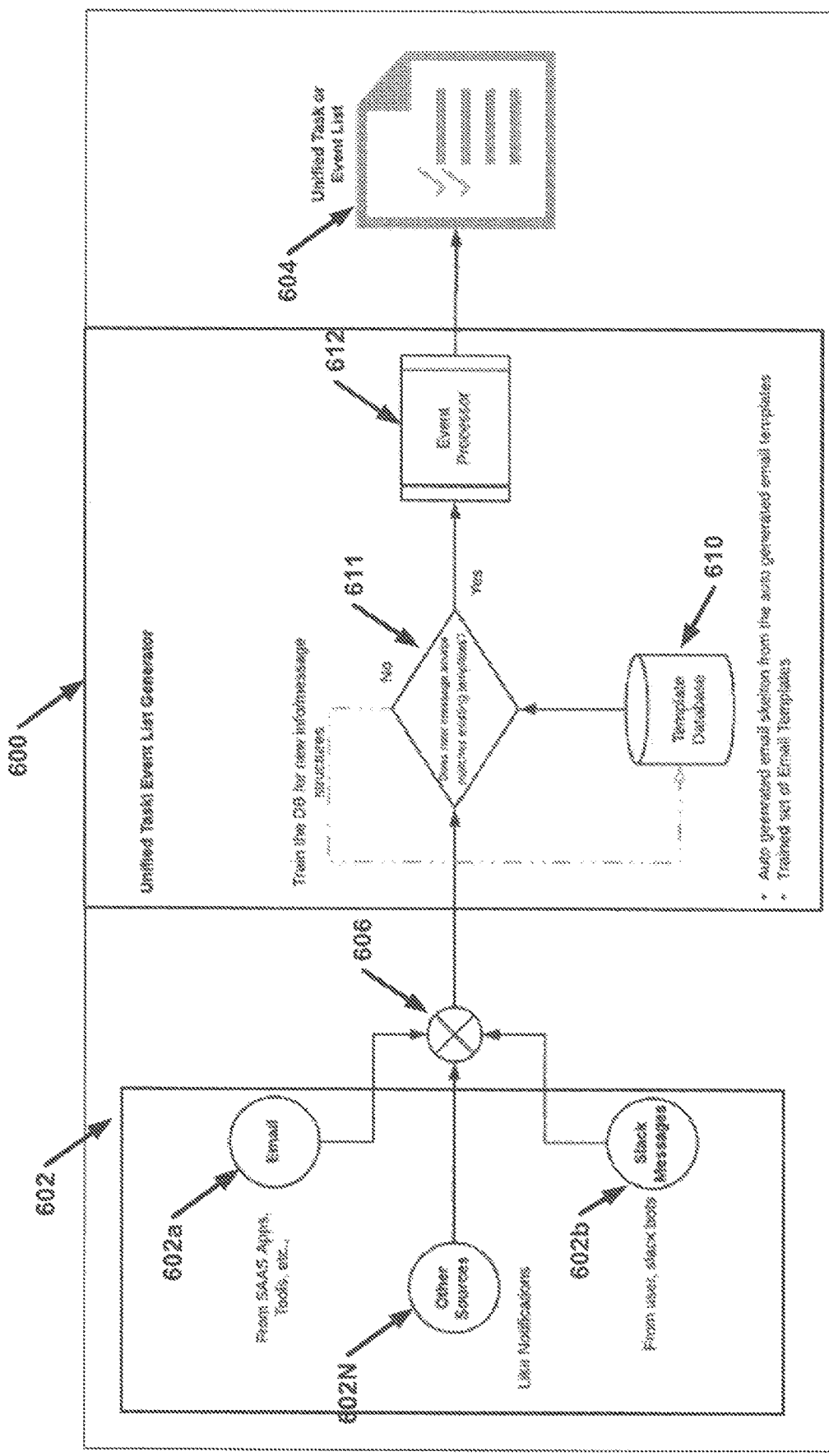
FIG. 6 is a block diagram of a unified event/task list generator.

Referring now to FIG. 6, a unified event/task list generator 600 configured to receive communications provided thereto from a variety of different sources generally denoted 602 and in response thereto generate a unified event/task list 604 includes an aggregator 606, an event/task processing system 608 (or more simply an event processor 408) and a database 610. It should be appreciated that in embodiments, one or both of aggregator 606 and database 610 may be part of event/task processing system 408. It should also be appreciated that sources 404 and unified event/task list 402 are not part of system 600.

Communication sources 602 may, for example, correspond to any auto-generated enterprise communication sources including fixed format communication sources 602a, which may, for example be provided from Software as a Service Applications (SAAS Apps), various tools (such as any of the tools made available by Citrix Systems, Inc) and variable format communication sources 602b (e.g. communications from users and real time message bots such as Slack bots). Examples of fixed and variable format communication sources include, but are not limited to email (fixed format communication) and real time messages (variable format communication). Communication sources 602 may also include any other type of communication source 600N (e.g. automated alerts and notifications).

Aggregator 606 is configured to receive communications on multiple different types of communication channels and thus is capable of receiving communications (e.g. auto-generated enterprise communications) from any of the sources 602.

In response to the communications provided thereto on one or more different channels, aggregator 606 provides the communications to unified event/task processing system 600. In embodiments, the aggregator provides the communications in the order in which it was received. In embodiments, the aggregator processes the communications before providing it to the event processor Unified event/task processing system 600 receives the communications provided thereto and processes the communications by comparing the new message item to templates stored in template database 610. Template database 610 may have one or more skeleton templates stored therein. It should be appreciated that database 610 may be provided as a single database or may comprise multiple databases. In the illustrative embodiment of FIG. 4, database 610 is configured to store communication items (i.e. communication from one of sources 602), one or more templates and one or more rules sets each of which may be associated with one or more templates. Communications received by system 600 (e.g. from aggregator 606) may thus optionally be stored in database 610 along with the templates and rule sets.

In response to system 600 receiving a communication item (e.g. from aggregator 606), as shown in block 611, system 600 attempts to match the item with a template stored in database 610. If In response to a communication matching a template in database 610, a rule set for that template is applied to the communication. In embodiments, there is at least one corresponding rule set for each template stored in database 610.

The skeleton structure defines the location of different parameters in the communication. It should be appreciated that the particular location of different parameters in the communication item depends upon the particular type of communication being processed. For example, the location of different parameters in an email, (for example, username, new assignee name, status, etc.) may differ from the location of similar parameters in a real time message (e.g. a Slack message). Furthermore, the location of different parameters in one type of email (or real time message) may differ from the location of the same parameters in a different type of email (or real time message). Using this information (i.e. the location of different parameters in a communication), the event/task processing system 408 will generate actionable tasks.

If a communication item is matched to a template, an event processor 612 parses the content of the communication using the appropriate template (i.e. the template matched to the communication) and the corresponding rule set and generates an event which is provided to (or added to) an event list as per the given structure of the template. The template may, for example, include fields for various pieces of information including, but not limited to at least some of the following information: the task/event description, due date, source of origin of the tasks/events, and any other available information. Event processor 612 may also classify the list. The list may, for example, be classified as belonging to one of an "Actionable" group and/or one of an "Information" group.

The so-created event/task list 604 can be highlighted/grouped/categorized based upon a variety of different pieces of information including but not limited to a date (e.g. a due date, priority and other classifications of the communications being processed so as to make the event/task list more user friendly.

Thus, in an embodiment, when processing a communication, event processor 600 may first check to see if database 610 has stored therein a template having a structure which matches a structure of a communication provided thereto (i.e. whether the template has a structure matching the structure of the communication being processed). For example, a determination is made in block 611 as to whether a specific type of email, real time message or other type of communication has a structure matching a particular structure of a template. The template structure defines the location of different parameters in the communication. Using this information (i.e. the location of different parameters in the communication), the event processor 612 applies a rule set associated with that template and generates actionable tasks which may be added to an actionable task list which in turn is provided (e.g. displayed or otherwise communicated) to a user.

In embodiments, one or more of an artificial intelligence (AI) system, a maximum likelihood processing (MLP) system and a machine learning (ML) system may create one or more the skeleton rule sets from new communications. This approach will make the system efficient. For example, in block 611, if a decision is made that no template matches a communication item being processed, then the item may be added to template database 610 and one or more of an artificial intelligence (AI) system, a maximum likelihood processing (MLP) system and a machine learning (ML) system may process the unmatched communication and generate one or more templates and one or more associated rule sets from new unmatched communications. In this way, at a future point in time when system 600 receives the same type (or a similar type) of communication, the system will be able to match the communication to the AI-generated template (or ML or MLP generated template) and an associated rule set.

The above-described system and techniques creates one or more unified task or event lists for users from auto generated enterprise communication channels.

Figure 7:
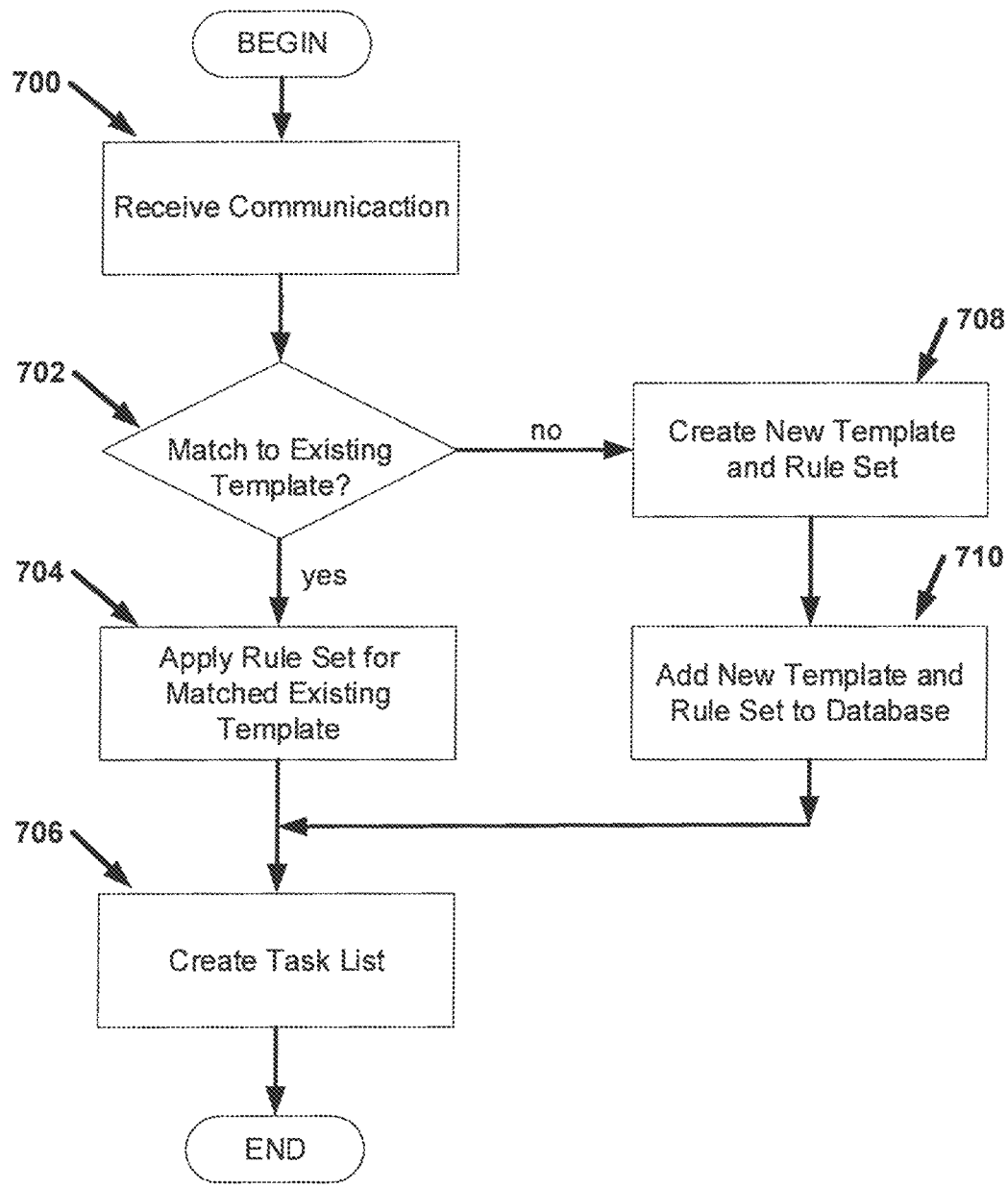
FIG. 7 is a flow diagram of an illustrative process for generating a task list.

FIG. 7 is a flow diagram showing illustrative processing for generating a task list. that can be implemented within the system 100 (FIG. 1), 400 (FIG. 4), 500 (FIG. 5) or 600 (FIG. 6). Rectangular elements (typified by element 700 in FIG. 7), are herein denoted "processing blocks," and represent computer software instructions or groups of instructions. Diamond shaped elements (typified by element 702 in FIG. 7), are herein denoted "decision blocks," and represent computer software instructions, or groups of instructions, which affect the execution of the computer software instructions represented by the processing blocks. Alternatively, the processing and decision blocks may represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated, the particular sequence of blocks described is illustrative only and can be varied without departing from the spirit of the concepts, structures, and techniques described. Thus, unless otherwise stated the blocks described below are unordered meaning that, when possible, the functions represented by the blocks can be performed in any convenient or desirable order.

It should be appreciated that the embodiments described herein can be implemented in various forms of hardware, software, firmware, or special purpose processors. For example, in one embodiment, a non-transitory computer readable medium includes instructions encoded thereon that, when executed by one or more processors, cause aspects of watermark system 504 described herein to be implemented. The instructions can be encoded using any suitable programming language, such as C, C++, object-oriented C, Java, JavaScript, Visual Basic .NET, BASIC, Scala, or alternatively, using custom or proprietary instruction sets. Such instructions can be provided in the form of one or more computer software applications or applets that are tangibly embodied on a memory device, and that can be executed by a computer having any suitable architecture. In one embodiment, the system can be hosted on a given website and implemented, for example, using JavaScript or another suitable browser-based technology to render, for example, the masked watermarks and/or complement watermarks described herein.

The functionalities disclosed herein (e.g. as in FIG. 7) can optionally be incorporated into a variety of different software applications and systems, including watermarking applications, image sharing applications, photo sharing applications, web authoring applications, and web authoring systems, to name a few examples. The functionalities disclosed herein can additionally or alternatively leverage services provided by separate software applications and systems. For example, in one embodiment, the functionalities disclosed herein can be implemented in a cloud environment, such as Microsoft® Azure®, AWS®, Google Cloud™, or any suitable cloud environment. Additionally or alternatively, the functionalities disclosed herein can be implemented using an IaaS framework. The computer software applications disclosed herein may include a number of different modules, sub-modules, or other components of distinct functionality, and can provide information to, or receive information from, still other components and services. These modules can be used, for example, to communicate with input/output devices such as a display screen, a touch sensitive surface, auditory interface, a digital camera, or any other suitable input/output device. Other components and functionality not reflected in the illustrations will be apparent in light of this disclosure, and it will be appreciated that the present disclosure is not intended to be limited to any particular hardware or software configuration. Thus, in other embodiments, the components illustrated in FIGS. 4-6, for example, may include additional, fewer, or alternative subcomponents. Furthermore, in some cases, one or more of the modules and components illustrated in the figures may be downloaded from a server computing system onto a user device for local execution.

In alternative embodiments, the computers and modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used in this regard, and that the present disclosure is not intended to be limited to any particular system architecture.

As will be further appreciated in light of this disclosure, for this and other processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Turning now to FIG. 7, an illustrative process for generating a task list (e.g. unified event/task list such as list 404 in FIG. 4 or list 604 in FIG. 6, begins as shown in processing block 700 in which a communication item (or more simply a communication is received). Processing then flow to decision block 702 in which a decision is made as to whether the received communication matches an existing template.

If in decision block 702 a decision is made that the communication matches an existing template, then processing flows to processing block 704 in which a rule set is applied to the communication. The rule set which is applied is associated with the template to which the communication was matched. An example of applying a rule set is next described. Each template has a type and a set of pre-defined actions associated with it. For example, when an email is received from JIRA saying:

Issue Type: Story
Assignee: Nandikotkur Achyuth
Components: Worxmail for Android
Created: 2019-07-16 02:20
Labels: g11n
Priority: ? Unset
Reporter: Sujie Li
Add Comment HTML content may be extracted from the above email and matched with all existing skeletons. In one example, matching a skeleton for above would be the following:

```
<!DOCTYPE html PUBLIC "-//W3C//DTD XHTML 1.0 Strict//EN"
"http://www.w3.orq/TR/xhtml1/DTD/xhtml1-strict.dtd"><html
xmlns="http://www.w3.org/1999/xhtml"><head>
<meta http-equiv="Content-Type" content="text/html; charset=utf-8">
    <meta name="viewport" content="width=device-width, initial-scale=1.0, maximum-
    scale=1.0">
    <base href="https://issues.citrite.net">
    <title>Message Title</title>
</head>
    <body class="jira" style="color: #333333; font-family: Arial, sans-serif; font-size: 14px; line-
height: 1.429">
        <table id="background-table" cellpadding="0" cellspacing="0" width="100%"
style="border-collapse: collapse; mso-table-lspace: 0pt; mso-table-rspace: 0pt; background-
```

```
color: #f5f5f5; border-collapse: collapse; mso-table-lspace: 0pt; mso-table-rspace: 0pt"
bgcolor="#f5f5f5">
    <!-- header here -->
    <tbody>
        <tr>
            <td id="header-pattern-container" style="padding: 0px; border-collapse: collapse;
padding: 10px 20px">
                <table id="header-pattern" cellspacing="0" cellpadding="0" border="0"
style="border-collapse: collapse; mso-table-lspace: 0pt; mso-table-rspace: 0pt">
                    <tbody>
                        <tr>
                            <td id="header-avatar-image-container" valign="top" style="padding: 0px;
border-collapse: collapse; vertical-align: top; width: 32px; padding-right: 8px" width="32">
<img id="header-avatar-image" class="image_fix" src="cid:jira-generated-image-avatar-
6cd0a0a2-f109-4280-b336-8b261076e1f8" height="32" width="32" border="0"
style="border-radius: 3px; vertical-align: top"> </td>
                            <td id="header-text-container" valign="middle" style="padding: 0px; border-
collapse: collapse; vertical-align: middle; font-family: Arial, sans-serif; font-size: 14px; line-
height: 20px; mso-line-height-rule: exactly; mso-text-raise: 1px"> <a class="user-hover"
rel="sujiel" id="email_sujiel"
href="https://issues.citrite.net/secure/ViewProfile.jspa?name=sujiel"
style="color:#0052cc;; color: #3b73af; text-decoration: none">Sujie Li</a>
<strong>created</strong> an issue </td>
                        </tr>
                    </tbody>
                </table> </td>
        </tr>
```

Once the skeleton is matched, the system retrieves or otherwise obtains various parameter values from the email such as:

Reporter, Assignee, Due Date, Priority, Labels, Components etc.

Every skeleton has one or more actions associated with it. In this case, the action associated with this skeleton it is to create an event in the event list with the above details.

Once the rule set is applied, processing then flows to processing block 706 in which a task list is created.

If in decision block 702 a decision is made that the communication does not match any existing template, then processing flows to processing block 708 in which a new template and associated rule set is generated based upon the communication. In embodiments this may be accomplished via the use of one or more of an artificial intelligence (AI) system, a maximum likelihood processing (MLP) system and a machine learning (ML) system. Processing then flows to processing block 710 in which the newly created/generated template and rule set are added to the database and made available for present or future processing. Processing then flows to processing block 706 in which a task list is created. Processing then ends.

In embodiments the method may further comprise one or more of: highlighting the event added to the event/task list; grouping the event added to the event/task list; and categorizing the event added to the event/task list. In embodiments, categorizing the event added to the event/task list may be based upon one or more of: a due date classification; a priority classification; or other classifications may include but are not limited to Work Event, Personal Event.

Referring now to FIG. 8, an illustrative auto generated email of the type which may be processed by a system such as one of the systems 400, 500 or 600 described herein. FIG. 8 illustrates that this type of email structure will be compared with a corresponding skeleton/template to identify values for each parameters such as reporter, assignee, due date, priority etc. and based upon predefined rules, an action or event is created. The example shown in FIG. 8 illustrates that an issue which was previously assigned to one person (e.g. User-A) has been assigned to someone else (e.g. User-B). So respective events if any which were previously created for this issue can be removed.

Figure 9:
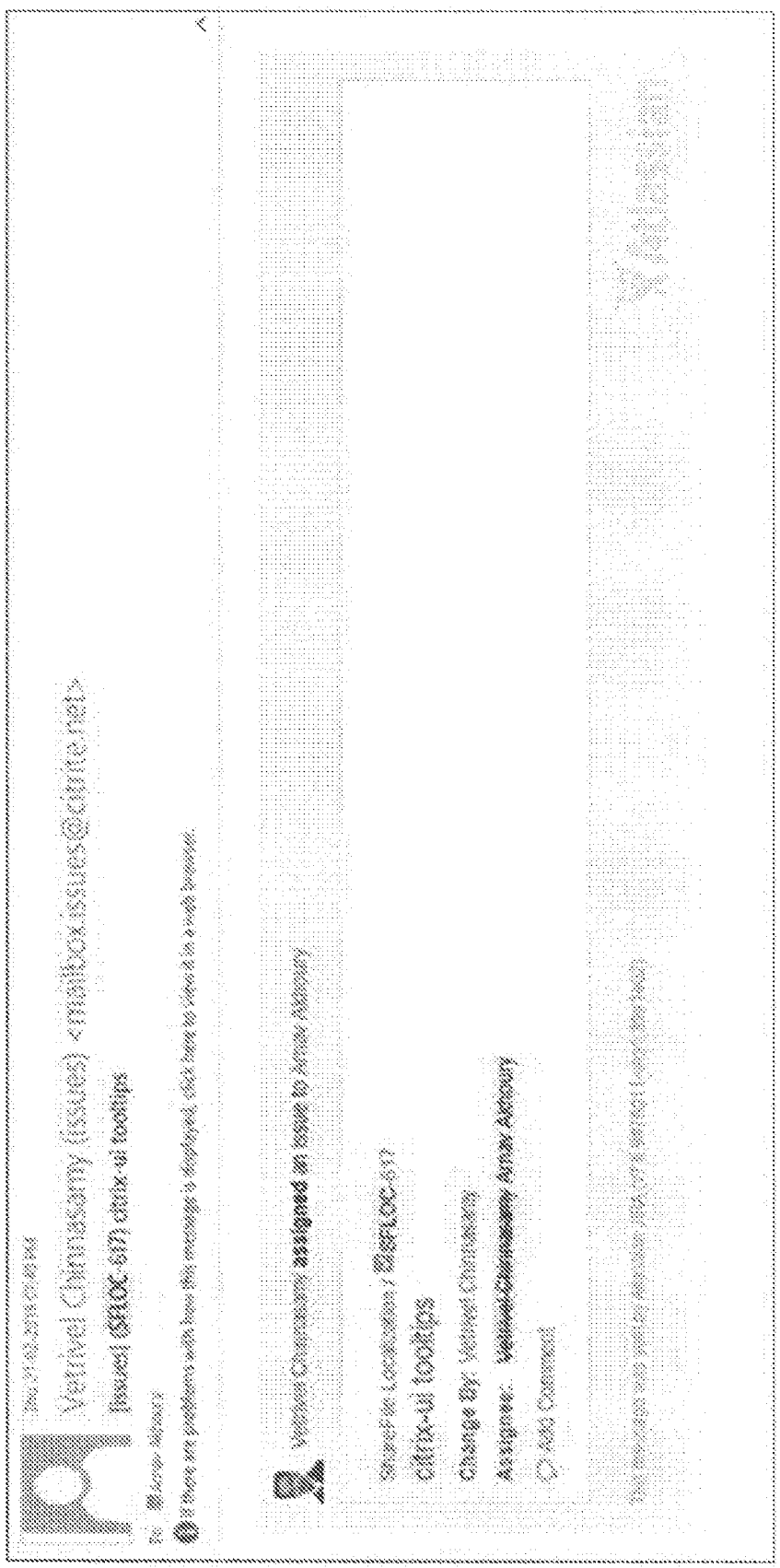
FIG. 9 is a screen shot of an auto generated mail from a service central SAAS, a corresponding skeleton rule set used for validation and a task list created from parsed email content.
Figure 9:
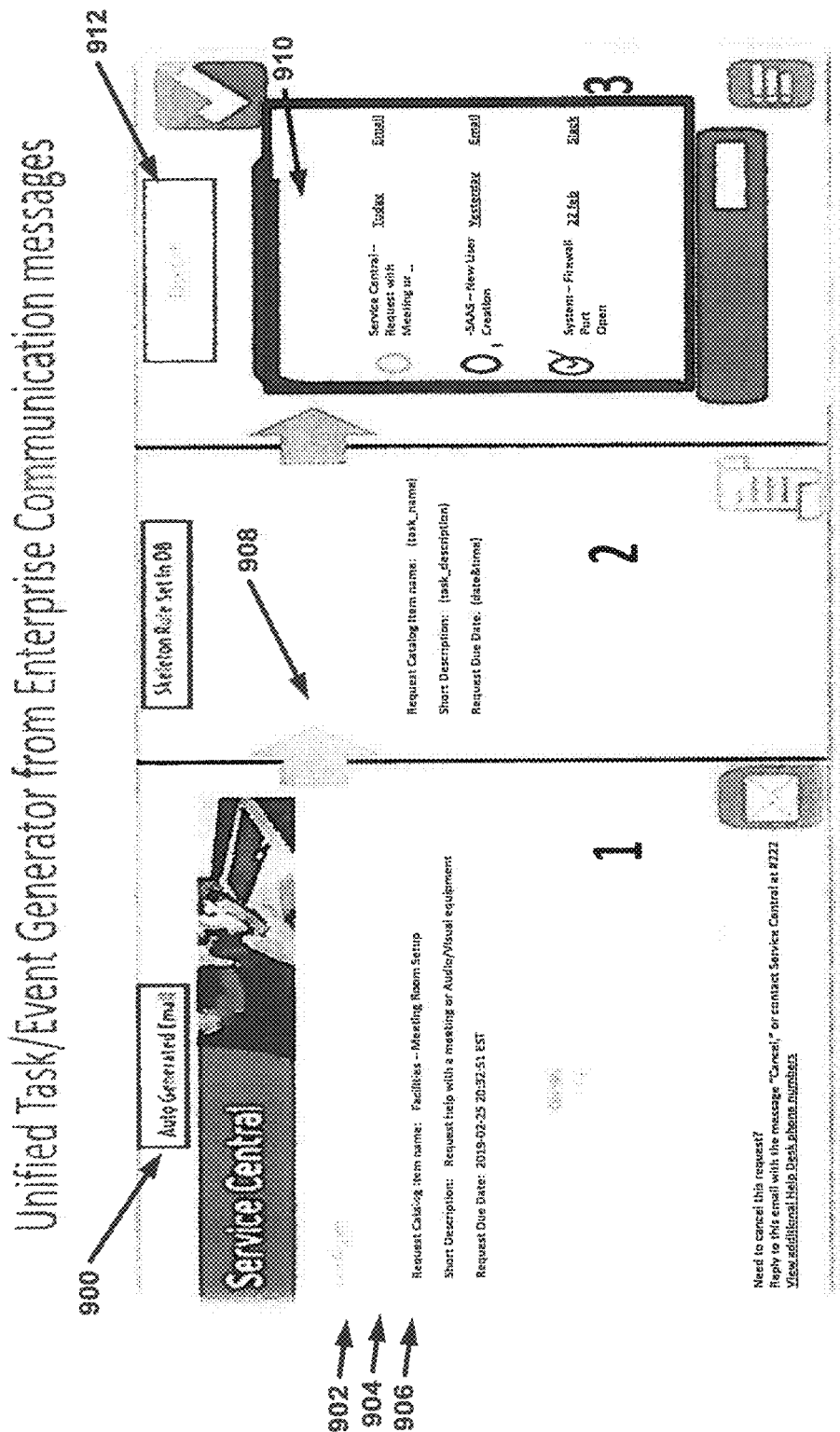

Referring now to FIG. 9, is a screen shot of an auto generated Email 900 from a service central SAAS, a corresponding skeleton rule set 908 (which may, for example, be stored in a database used for validation) and a task list 912 having an item generated from parsed email content. In this example, service central an SAAS Email 900 requesting help with a meeting on Audio Visual equipment 904 on a specific date 906 is received by a system for receiving a communication (such as one of the systems 400, 500 or 600 described herein).

In response to receiving the SAAS Email 900, the system processes the email by comparing the email to one or more templates (which may, for example be stored in a database). In this example a template (labelled as a skeleton rule set in FIG. 9) in the database has a structure 908 which matches the structure of the SAAS Email. In particular, the template has field labeled "Request catalog Item names" corresponding to field 902 in SAAS Email 900, a field labeled "Short Description" corresponding to field 904 in SAAS Email 900 and a field labeled "Request Due Date" corresponding to field 906 in SAAS Email 900. Thus, the structure of this template matches the structure of the SAAS Email 900.

Since there is a match between the structure of the SAAS Email 900 and the structure of a template, a rule set (not shown in FIG. 9) associated with the template is applied to the SAAS Email. In this example, the rule set parses the SAAS Email and generates a task 910 which is added to the unified event/task list 912. It should be appreciated that a template is unique to a certain mail SAAS email type.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect, connecting, and coupling.

Also, it should be appreciated that in the above description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

All publications and references cited herein are expressly incorporated herein by reference in their entirety.

What is claimed is:

1. An event/task processing system comprising:
    a processor; and
    a non-volatile memory storing executable instructions that when executed on the processor causes the processor to:
        receive, by a matching engine, a communication originated from one of a plurality of different resources, the communication having a corresponding first structure;
        compare, by the matching engine, the received communication to one or more skeleton templates in a database, each of the one or more templates having a corresponding second structure and a corresponding rule set;
        responsive to the first structure of the received communication matching a second structure of a skeleton template of the one or more skeleton templates:
            parse, by a parser, content from the communication using the skeleton template to which the first structure of the received communication is matched; and
            generate, by the matching engine, an event by applying a rule set corresponding to the skeleton template to which the first structure of the received communication is matched, wherein the event is in accordance with the second structure of the skeleton template to which the received communication is matched; and
        responsive to the first structure of received communication not matching the second structure of any of the one or more skeleton templates:
            generate, by an aggregator, a new template and a new rule set based on the received communication; and
            add the new template and the new rule set to the database, such that the new template and the new rule set are made available for processing.

2. The event/task processing system of claim 1 wherein the generated event corresponds to one of: a task/event description; a source of the tasks/events; a time of the task/event; and a due date of the task/event.

3. The event/task processing system of claim 1 wherein one of the matching engine or parser utilizes the rules sets to classify the generated event.

4. The event/task processing system of claim 1 wherein one of the matching engine or parser utilizes the rules set to classify the generated event as one of: an actionable event or an informational event.

5. The event/task processing system of claim 1 wherein the matching engine and parser are configured to process at least emails and real-time messages, including but not limited to, text messages and instant messages.

6. The event/task processing system of claim 1 wherein the matching engine and parser are configured to process at least fixed and/or variable length communications.

7. A method comprising:
    receiving, by a computing device, a communication originated from one of a plurality of different resources, the communication having a corresponding first structure;
    comparing, by the computing device, the received communication to one or more skeleton templates in a database, each of the one or more templates having a corresponding second structure and a corresponding rule set;
    responsive to the first structure of the received communication matching a second structure of a skeleton template of the one or more skeleton templates:
        parsing, by the computing device, content from the communication using the skeleton template to which the first structure of the received communication is matched; and
        generating, by the computing device, an event by applying a rule set corresponding to the skeleton template to which the first structure of the received communication is matched, wherein the event is in accordance with the second structure of the skeleton template to which the received communication is matched; and
    responsive to the first structure of received communication not matching the second structure of any of the one or more skeleton templates:
        generating, by the computing device, a new template and a new rule set based on the received communication; and
        adding the new template and the new rule set to the database, such that the new template and the new rule set are made available for processing.

8. The method of claim 7 wherein the generated event corresponds to one of: a task/event description; a source of the tasks/events; a time of the task/event; and a due date of the task/event.

9. The method of claim 7 further comprising utilizing, by the computing device, the rules sets to classify the generated event.

10. The method of claim 7 further comprising utilizing, by the computing device, the rules set to classify the generated event as one of: an actionable event or an informational event.

11. The method of claim 7 further comprising processing, by the computing device, at least emails and real-time messages, including but not limited to, text messages and instant messages.

12. The method of claim 7 further comprising processing, by the computing device, at least fixed and/or variable length communications.

13. A non-transitory machine-readable medium encoding instructions that when executed by one or more processors cause a process to be carried out, the process including:
    receiving a communication originated from one of a plurality of different resources, the communication having a corresponding first structure;
    comparing the received communication to one or more skeleton templates in a database, each of the one or more templates having a corresponding second structure and a corresponding rule set;

responsive to the first structure of the received communication matching a second structure of a skeleton template of the one or more skeleton templates:
  parsing content from the communication using the skeleton template to which the first structure of the received communication is matched; and
  generating an event by applying a rule set corresponding to the skeleton template to which the first structure of the received communication is matched, wherein the event is in accordance with the second structure of the skeleton template to which the received communication is matched; and responsive to the first structure of received communication not matching the second structure of any of the one or more skeleton templates:
  generating a new template and a new rule set based on the received communication; and
  adding the new template and the new rule set to the database, such that the new template and the new rule set are made available for processing.

14. The non-transitory machine-readable medium of claim 13 wherein the generated event corresponds to one of: a task/event description; a source of the tasks/events; a time of the task/event; and a due date of the task/event.

15. The non-transitory machine-readable medium of claim 13 wherein the process further includes utilizing the rules sets to classify the generated event.

16. The non-transitory machine-readable medium of claim 13 wherein the process further includes utilizing the rules set to classify the generated event as one of: an actionable event or an informational event.

17. The non-transitory machine-readable medium of claim 13 wherein the process further includes processing at least emails and real-time messages, including but not limited to, text messages and instant messages.

18. The non-transitory machine-readable medium of claim 13 wherein the process further includes processing at least fixed and/or variable length communications.

* * * * *